United States Patent
Faden

(10) Patent No.: US 8,819,681 B2
(45) Date of Patent: Aug. 26, 2014

(54) METHOD AND SYSTEM FOR IMPLEMENTING PRIMARY AND SECONDARY ZONES IN A VIRTUALIZED ENVIRONMENT

(75) Inventor: Glenn T. Faden, San Rafael, CA (US)

(73) Assignee: Oracle International Corporation, Redwood Shores, CA (US)

( * ) Notice: Subject to any disclaimer, the term of this patent is extended or adjusted under 35 U.S.C. 154(b) by 210 days.

(21) Appl. No.: 13/570,900

(22) Filed: Aug. 9, 2012

(65) Prior Publication Data

US 2014/0047225 A1    Feb. 13, 2014

(51) Int. Cl.
| | | |
|---|---|---|
| G06F 9/455 | (2006.01) | |
| G06F 9/46 | (2006.01) | |
| G06F 12/00 | (2006.01) | |
| G06F 12/14 | (2006.01) | |
| G06F 9/50 | (2006.01) | |
| G06F 21/62 | (2013.01) | |

(52) U.S. Cl.
CPC .......... *G06F 9/5077* (2013.01); *G06F 21/6281* (2013.01); *G06F 21/62* (2013.01); *G06F 21/6218* (2013.01); *G06F 9/45533* (2013.01); *G06F 9/45537* (2013.01)
USPC ........ 718/1; 718/100; 726/2; 726/16; 726/21; 726/26; 726/27

(58) Field of Classification Search
None
See application file for complete search history.

(56) References Cited

U.S. PATENT DOCUMENTS

| | | | | |
|---|---|---|---|---|
| 7,882,227 B2 * | 2/2011 | Faden | ............... | 709/225 |
| 7,885,975 B2 | 2/2011 | Faden | | |
| 2007/0208873 A1 * | 9/2007 | Lu et al. | ............. | 709/238 |
| 2007/0245030 A1 * | 10/2007 | Das et al. | ............. | 709/229 |

\* cited by examiner

*Primary Examiner* — Qing Wu
(74) *Attorney, Agent, or Firm* — Osha Liang LLP

(57) ABSTRACT

A system including a processor and a host operating system (OS) executing on the processor. The Host OS including a global zone, a first primary non-global (NG) zone associated with a first label and a first internet protocol (IP) address, where the first primary NG zone is accessible by a desktop layer of the system. The Host OS further including a second primary NG zone associated with a second label and the first IP address, wherein the second primary NG zone is accessible by the desktop layer of system. The global zone is configured to receive a first request to create a secondary NG zone with the first label, and in response to the first request, create the secondary NG zone associated with the first label and a second IP address, where the secondary NG zone is not accessible by the desktop layer of the system.

20 Claims, 7 Drawing Sheets

METHOD AND SYSTEM FOR IMPLEMENTING PRIMARY AND SECONDARY ZONES IN A VIRTUALIZED ENVIRONMENT

BACKGROUND

Computer systems typically include access control mechanisms to control access to the data stored in the computer system. The granularity of the access control on a given computer system may vary based upon the implementation of the computer system and/or the file system operating on the computer system. When resources on a computer system are virtualized, the ability to maintain fine grained access to the data on the computer system while taking full advantage of the virtualization features may become more challenging. In particular, traditional approaches to this problem had to compromise by either limiting the virtualization features that could be implemented or by limiting the granularity of the access control.

SUMMARY

In general, in one aspect, the invention relates to a system including a processor, a host operating system (OS) executing on the processor and including a global zone, a first primary non-global (NG) zone associated with a first label and a first internet protocol (IP) address, where the first primary NG zone is accessible by a desktop layer of the system, and a second primary NG zone associated with a second label and the first IP address, where the second primary NG zone is accessible by the desktop layer of system, wherein the global zone is configured to receive a first request to create a secondary NG zone with the first label, and in response to the first request, create the secondary NG zone associated with the first label and a second IP address, where the secondary NG zone is not accessible by the desktop layer of the system.

In general, in one aspect, the invention a system including a processor, a host operating system (OS) executing on the processor and including a global zone, a first secondary non-global (NG) zone associated with a first label and a first internet protocol (IP) address, where the first secondary NG zone is not accessible by a desktop layer of the system, and a second secondary NG zone associated with the first label and a second IP address, where the second secondary NG zone is not accessible by the desktop layer of system, where the global zone is configured to receive a first request to create a first primary NG zone with the first label, and in response to the first request, create the first primary NG zone associated with the first label and a third IP address, where the first primary NG zone is accessible by the desktop layer of the system.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for implementing primary and secondary zones. More specifically, embodiments of the invention provide a method and system that enables two different types of zones to co-exist in the same global zone. As a result, a user can take advantage of the various security features offered by the primary zones while at the same time take advantage of the additional security granularity offered by the secondary zones.

Figure 1:
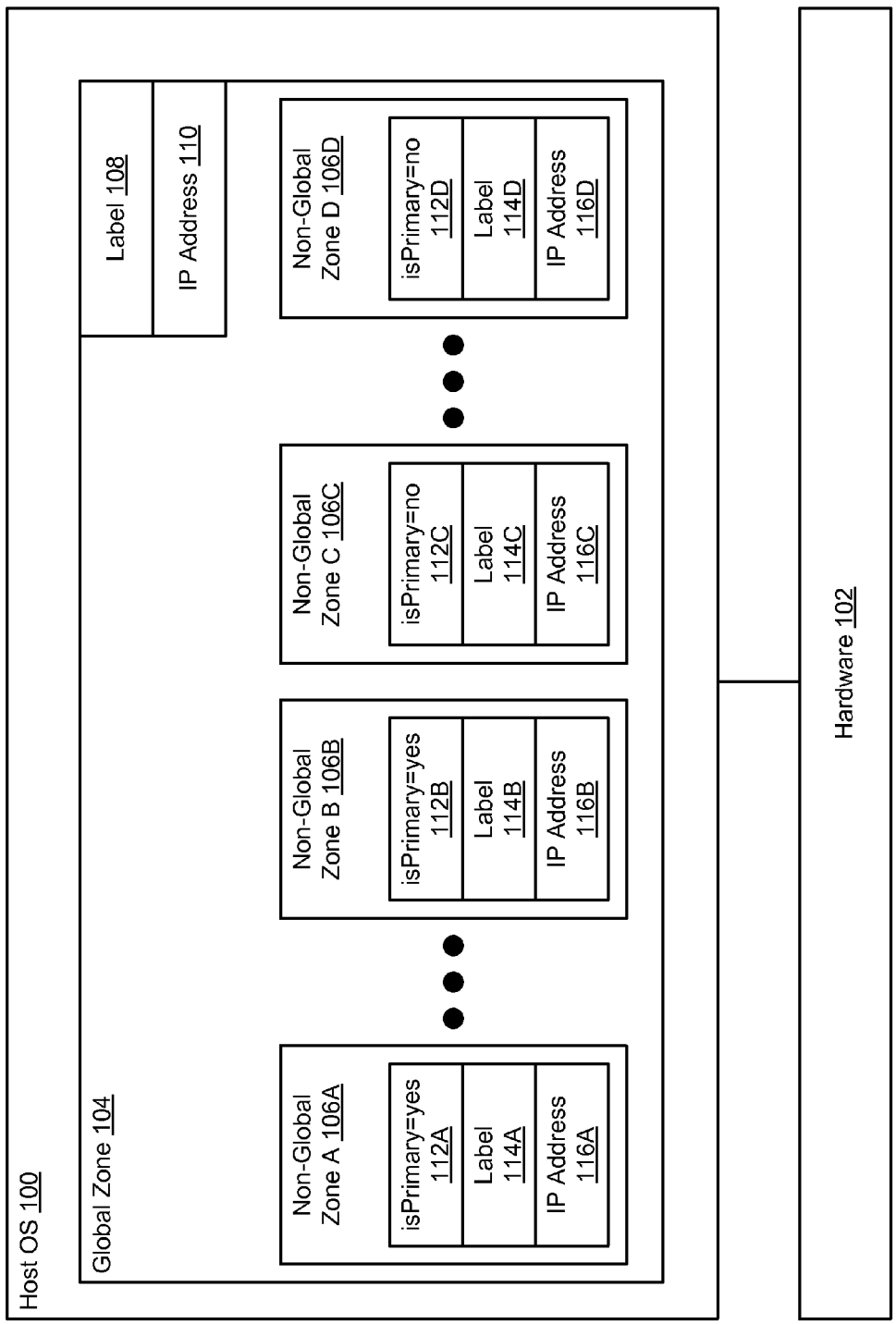
FIGS. 1 and 2 show systems in accordance with one or more embodiments of the invention.

FIG. 1 shows a system in accordance with one or more embodiments of the invention. The system includes a host operating system (OS) (100) executing on hardware (102). The host OS (100) may be any OS that includes functionality to support the virtualization as described below and to implement one or more embodiments of the invention. The hardware (102) corresponds to a processor(s), memory(ies), persistent storage, input/output interfaces, and/or any other hardware components necessary to implement one or more embodiments of the invention.

In one embodiment of the invention, the host OS (100) includes functionality to support virtualization of the resources of the host OS as well as virtualization of the hardware (102). In one embodiment of the invention, the aforementioned virtualization is implemented using a global zone (104) and one or more non-global zones (106A, 106B, 106C, 106D). The global zone (104) and the non-global zones (106A, 106B, 106C, 106D) all execute on the same OS image. However, each of the zones (global and non-global) is an isolated execution environment. More specifically, processes executing in a non-global zones only have access to resources that are exposed to the particular non-global zone. As such, processes executing in one non-global zone are unable to "see" or interact with resources (including file systems) or processes in other non-global zones or with resources or processes in the global zone. Unlike the non-global zones, the global zone is able to "see" and interact with processes and resources within all non-global zones.

In one embodiment of the invention, the global zone (104) is associated with an Internet Protocol (IP) address (110) and a label (108). The IP address (110) assigned to the global zone (104) is used to route packets to processes and/or application instances executing exclusively within the global zone (104), i.e., not executing in any of the non-global zones. In one embodiment of the invention, the label (108) associated with the global zone (104) is the lowest label within the label hierarchy, i.e., the label associated with the global zone is strictly dominated by all other labels associated with the non-global zones.

In one embodiment of the invention, a first label dominates a second label if the following condition(s) is met: (i) the classification component of the first label is equal to or outranks the classification component of the second label and (ii) optionally, all compartments in the second label are included in the first label. Further, two labels are said to be equal if they have the same classification and, if present, the same set of compartments. If they are equal, they are said to dominate each other. Further, the first label is said to strictly domination the second label if the first label has a higher classification or includes all of the second label's compartments. Two labels are said to be disjoint or non-comparable if neither label dominates the other.

In one embodiment of the invention, each non-global zone (106A, 106B, 106C, 106D) is either designated as a primary zone or a non-primary zone (also referred to as a secondary zone). The determination of whether a given non-global zone is a primary zone or a non-primary zone is based on the status of an isPrimary attribute (112A, 112B, 112C, 112D) associated with the non-global zone. In one embodiment of the invention, the isPrimary attribute is set by the global zone when the non-global zone is created. Further, the isPrimary attribute cannot be changed once the non-global zone is created. Those skilled in the art will appreciate that while each of the non-global zones is associated with an isPrimary attribute, the isPrimary attribute does not need to be located within the non-global zone. Instead, the values for the isPrimary attribute for all of the non-global zones may be maintained in a data structure (not shown) that is populated and managed by the Host OS and/or the global zone and located within the Host OS and/or global zone.

In one embodiment of the invention, each non-global zone is associated with an Internet Protocol (IP) address (116A, 116B, 116C, 116D) and a label (114A, 114B, 114C, 114D). The IP address assigned to each non-global zone is used to route packets to processes and/or application instances executing exclusively within the particular non-global zone. The particular IP address that may be assigned to a given non-global zone varies based on whether the non-global zone is a primary or non-primary zone. This is described in more detail below with respect to FIG. 3.

The label associated with each non-global zone is used to control access to content and processes within the non-global zone. The particular label associated with a given non-global zone varies based on whether the non-global zone is a primary or non-primary zone. This is described in more detail below with respect to FIG. 3.

In one embodiment of the invention, the global zone or a process executing external to the global zone but on the host OS is responsible for controlling access to processes and data within (or associated with) the non-global zones.

In one embodiment of the invention, each non-global zone may include zero or more single-level file systems (SLFSs) (not shown). The SLFS (if present in a non-global zone) is directly mounted within the particular non-global zone. When a SLFS is mounted within the non-global zone the content of the file system resides within the zone in which it is mounted. Each SLFS is implicitly associated with a label, i.e., the label of the non-global zone in which it is mounted. In one embodiment of the invention, each non-global zone may include zero or more multi-level file systems (MLFS). One or more embodiments of MLFSs is described in co-owned U.S. patent application Ser. No. 13/570,825 entitled "METHOD AND SYSTEM FOR IMPLEMENTING A MULTILEVEL FILE SYSTEM IN A VIRTUALIZED ENVIRONMENT" filed on Aug. 9, 2012. The aforementioned U.S. patent application is here by incorporated by reference in its entirety.

In one embodiment of the invention, the implicit label of a file residing in SLFS in a first primary zone may be changed to (i.e., relabeled with) another implicit label provided that there is another primary zone within the global zone that includes such a label. If another such primary zone does not exist the command fails. However, if such a primary zone (hereafter "target primary zone") exists, then the file is removed from the current SLFS and a copy of the file is created within the SLFS in the target primary zone. In one embodiment of the invention, files within an SLFS located within non-primary zone may not be relabeled.

Those skilled in the art will appreciate that the invention is not limited to the system implementation shown in FIG. 1. More specifically, the global zone may include zero or more primary zones and zero or more non-primary zones without departing from the invention.

Figure 2:
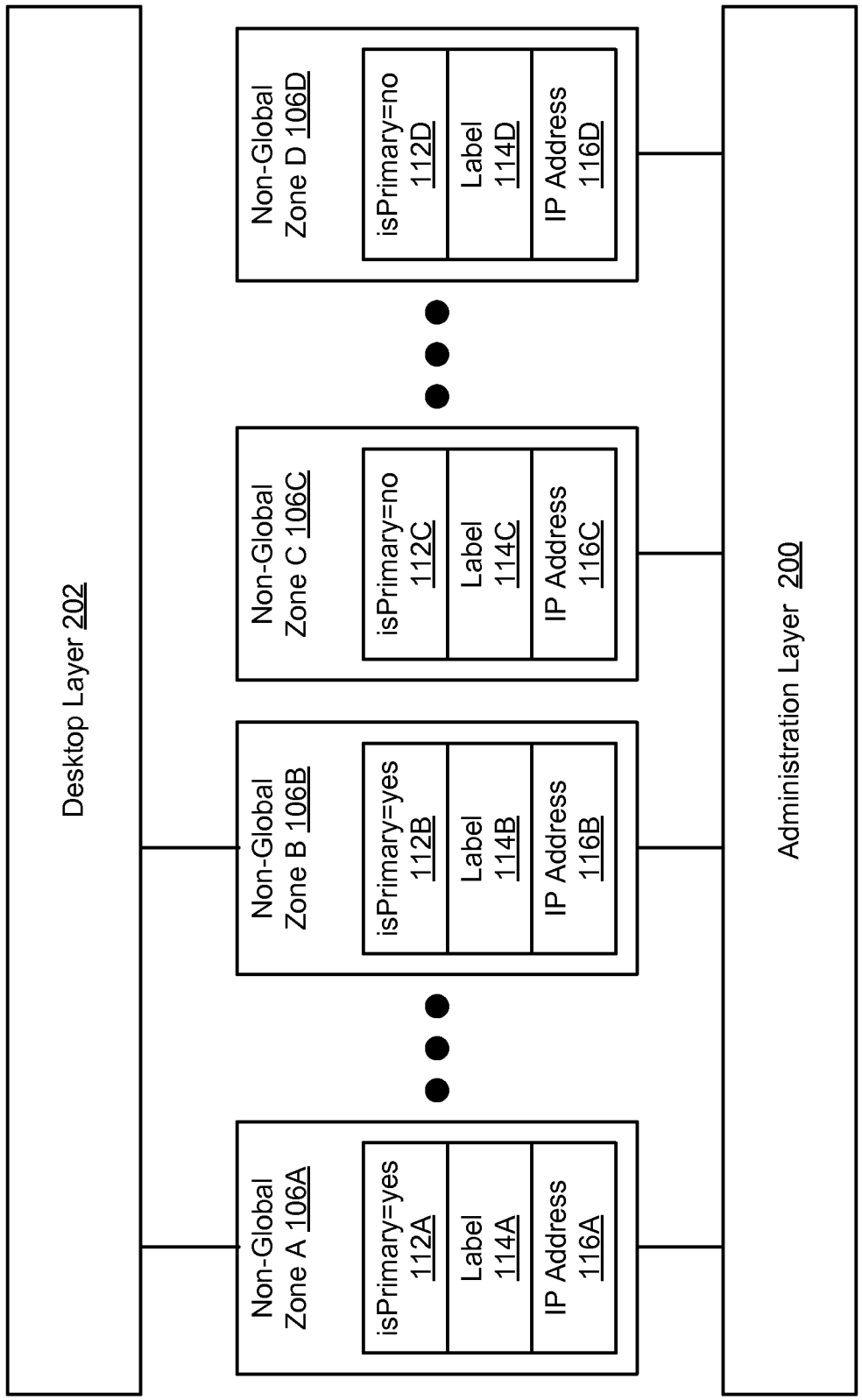

Referring to FIG. 2, in one embodiment of the invention, the visibility of a given non-global zone to various layers within the host operating system varies based on whether the non-global zone is a primary zone or a non-primary zone. More specifically, all non-global zones, regardless of whether they are primary zones or non-primary zones, are visible to an administration layer (200) in the host OS (not shown). In particular, users with administrative-level access are able to view all non-global zones and to interact with the non-global zones via the administration layer (200). Said another way, all users with administrative-level access may interact with all non-global zones via a user interface provided by the administration layer (200).

However, users that do not have administrative-level access cannot interact with non-primary zones. Rather, users without administrative-level access can only interact with the primary zones via a desktop environment provided by the desktop layer. Said another way, users without administrative-level access do not have any access via the desktop layer (202) to interact with the non-primary zones. As a result, users without administrative-level access cannot interact with the non-primary zones via a graphical user interface provided by the desktop layer. The desktop environment may include, but is not limited to, icons, windows, toolbars, folders, wallpapers and desktop widgets. In one embodiment of the invention, the host OS determines which zones (global, primary, and non-primary) are accessible to particular layers within the host OS. In one embodiment of the invention, the aforementioned access for a given non-global zones is based value of the isPrimary attribute for the non-global zone.

Figure 3:
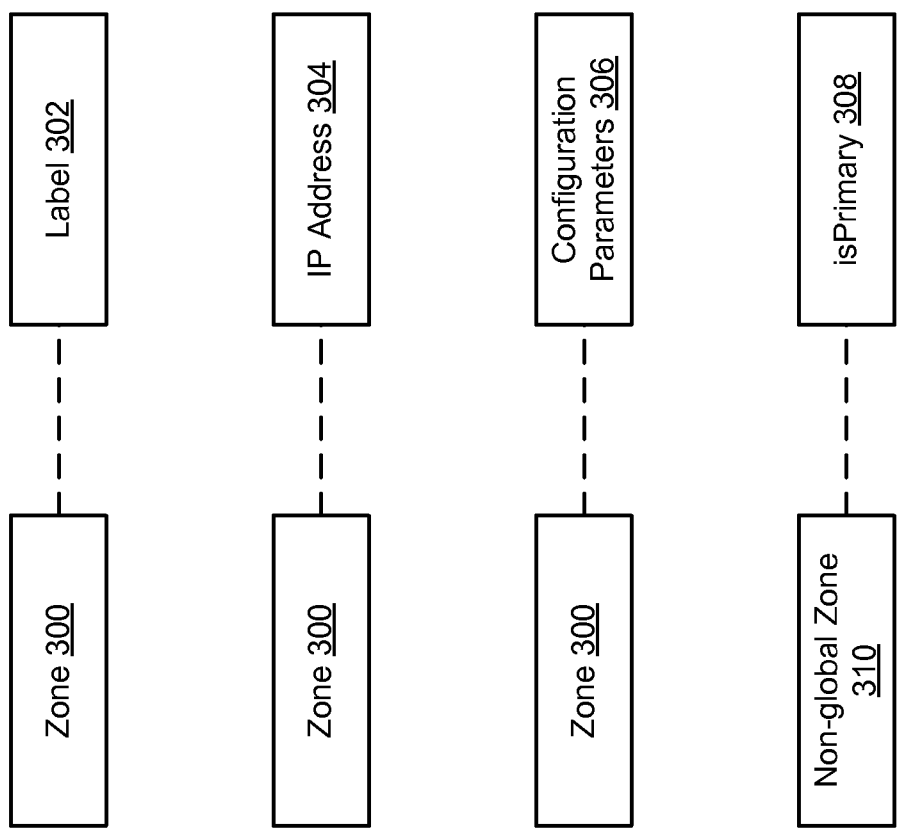
FIG. 3 shows the relationships between various components/data structures in the system in accordance with one or more embodiments of the invention.

FIG. 3 shows the relationships between various components/data structures in the system in accordance with one or more embodiments of the invention. In one embodiment of the invention, each zone (300) (global or non-global) is associated with a label (302). The global zone or a process executing external to the global zone but on the host OS may track the label associated with the each of the zones.

As discussed above, the label associated with a given zone varies based on whether the zone is a global zone, a primary zone, or a non-primary zone. In one embodiment of the invention, the global zone includes a unique label (as described above) that is not shared with any other primary zone or non-primary zone. Further, each primary zone must have its own unique label relative to all other primary zones executing within the global zone. Said another way, no two primary zones within the global zone may have the same label. In contrast, each non-primary zone may be associated with any label (regardless of whether the label is used by a primary zone) except the label associated with the global zone in which it is located.

In one embodiment of the invention, each label is associated with a classification, which indicates the hierarchy/level of security. Some non-limiting examples of classifications include top secret, secret, confidential, unclassified, public, internal, need to know, and registered. The classification may also be denoted using any scheme based on numbers, letters, symbols, or any combination thereof. In one embodiment of the invention, a label may also include a compartment, which represents a group. Some non-limiting examples of compartments include work group, department, project, topic. The compartment may also be denoted using any scheme based on numbers, letters, symbols, or any combination thereof. A given label may include a classification component, which specifies a classification and, optionally, a compartment component, which specifies a compartment.

Returning to FIG. 3, in one embodiment of the invention, each zone (300) is associated with an IP address (304). As discussed above, the IP address associated with a given zone varies based on whether the zone is a global zone, a primary zone, or a non-primary zone. In one embodiment of the invention, the global zone and primary zones may share IP addresses; however this is not required. Accordingly, the global zone and all primary zones have the same IP address. Alternatively, the global zone may have its own unique IP address and all the primary zones may share another unique IP address. In another embodiment, the global zone and a subset of the primary zones may share an IP address or only a subset of the primary zones may share an IP address. In contrast, each non-primary zone must have its own unique IP address such that there is no other zone (global, primary, or non-primary) executing on the host operating system with the same IP address.

In one embodiment each zone (global, primary zone, or non-primary zone) is associated with configuration parameters (306). The configuration parameters specify (i) the resources (CPU time, bandwidth, memory, etc) assigned to the particular zone; (ii) whether the zone is immutable, i.e., read-only, and (iii) privileges, which provide fine-grained control over the actions of processes, where the possession of a certain privilege allows a process to perform a specific set of restricted operations.

In one embodiment of the invention, each process in a zone is associated with four sets of privileges—inheritable set (the set of privileges that a child process gets on execution), permitted set (P) (the maximum set of privileges for the process), effective set (P that are currently asserted as need by the process), and limit set (the upper bound of privileges that a process or its children can obtain). In one embodiment of the invention, all defined privileges with the exception of the "basic" privileges compose the set of privileges that are traditionally associated with the root user. The "basic" privileges are "privileges" unprivileged processes were accustomed to having. In one embodiment of the invention, each non-global zone (primary or non-primary) may have its own unique limit set.

Continuing with the discussion of FIG. 3, in one embodiment of the invention each non-global zone (310) is associated with an isPrimary attribute (308), which is used to specify to the global zone and/or host OS that the particular non-global zone is either a primary zone or a non-primary zone. Those skilled in the art will appreciate that any attribute of any type may be used to specify that the particular non-global zone is either a primary zone or a non-primary zone without departing from the invention.

Figure 4:
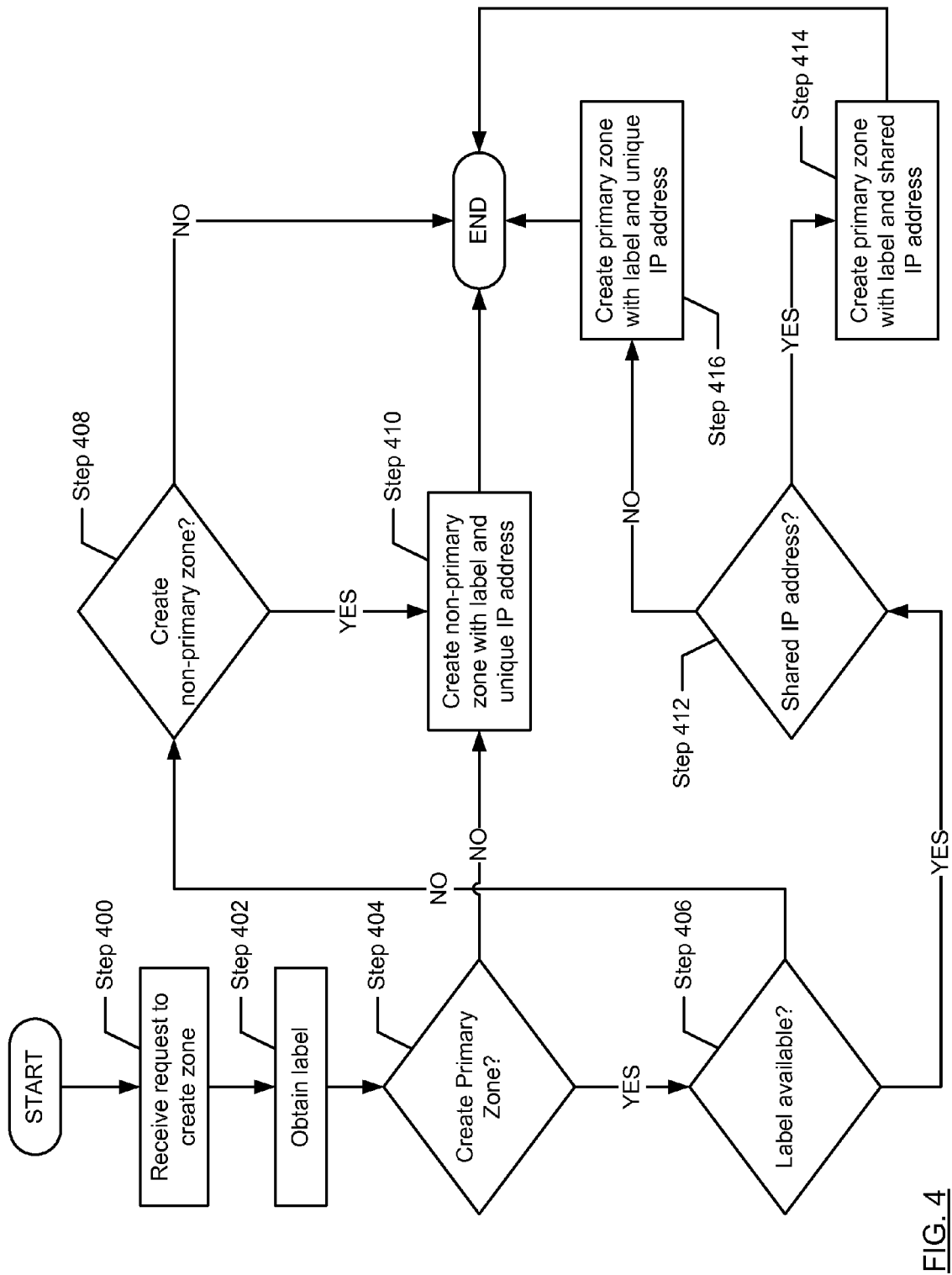
FIG. 4 shows a flowchart for creating zones in accordance with one or more embodiments of the invention.
Figure 5:
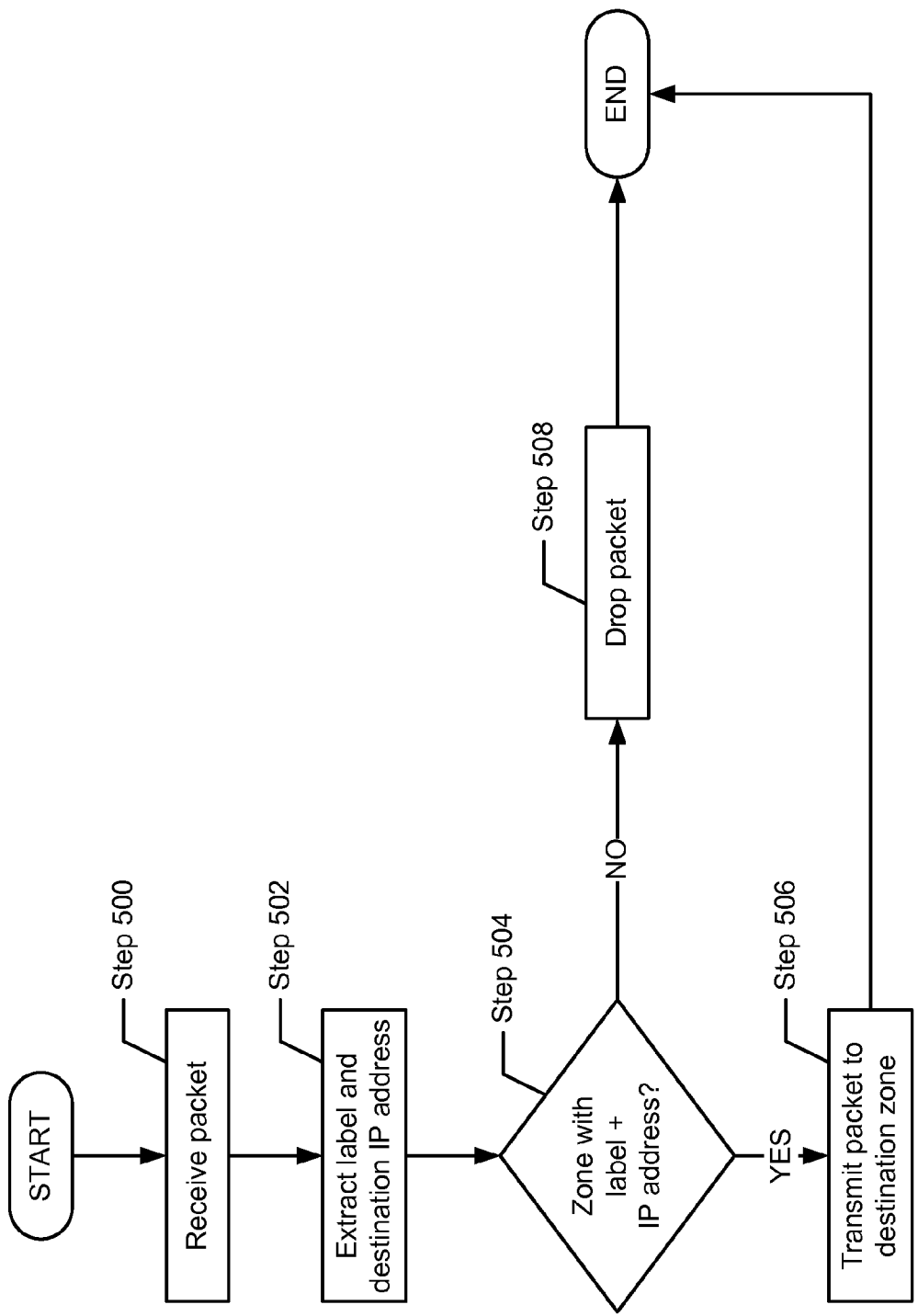
FIG. 5 shows a flowchart for processing packets received by a system in accordance with one or more embodiments of the invention.

FIGS. 4-5 show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel.

Referring to FIG. 4, FIG. 4 shows a flowchart for creating zones in accordance with one or more embodiments of the invention. In Step 400, the global zone receives a request to create a non-global zone. In Step 402, the label for the new non-global zone is obtained. Those skilled in the art will appreciate that the label may be extracted from the request in Step 400 or may be obtained separately from the request in Step 400. In Step 404, a determination is made about whether to create the new non-global zone as a primary zone. If the new non-global zone is to be a primary zone, the process proceeds to Step 406; otherwise, the process proceeds to Step 410.

In Step 406, a determination is made about whether the label obtained in Step 402 is already associated with the global zone or another primary zone within the global zone. If the label obtained in Step 402 is already associated with the global zone or another primary zone within the global zone, the process proceeds to Step 408; otherwise, the process proceeds to Step 412. In one embodiment of the invention, the Host OS and/or the global zone includes a data structure(s) that tracks the label associated with which zone. The aforementioned data structures may be used in the determination in Step 406.

In Step 408, a determination is made about whether to create a non-primary zone with the label obtained in Step 400. More specifically, at this stage, a determination has been made that there is already a primary zone with the specified label and, as such, if the administrator would like to still create a non-primary zone with the specified label. Those skilled in the art will appreciate that Step 408 may be performed automatically based on a previously set administrator preference or with input from the administrator. If a non-primary zone is to be created, the process proceeds to Step 410; otherwise, the process ends.

In Step 410, a non-primary zone is created in the global zone. More specifically, the non-primary zone is associated with an isPrimary attribute set to indicate that the non-global zone is a non-primary zone. In addition, the non-primary zone is associated with the label obtained in Step 402 and a unique IP address, which may be provided by the administrator, the Host OS and/or the global zone. The Host OS and/or global zone records the aforementioned information in one or more data structures located within the global zone and/or Host OS. In one embodiment of the invention, creating the non-primary zone also includes specifying various configuration parameters as discussed above.

In Step 412, if the primary zone with the label can be created, i.e., noe of the global zone, the primary zones within the global zone, and the non-primary zones in the global zone are associated with the label, a determination is made about whether the new primary zone is to be associated with a shared IP address, i.e., an IP address that is associated with the global zone or at least one other primary zone in the global zone. If the new primary zone is to be associated with a shared IP address, the process proceeds to Step 414; otherwise, the process proceeds to Step 416.

In Step 414, a primary zone is created in the global zone. More specifically, the primary zone is associated with an isPrimary attribute set to indicate that the non-global zone is a primary zone. In addition, the primary zone is associated with the label obtained in Step 402 and an IP address that is associated with at least one of the global zone or another primary zone within the global zone. The shared IP address may be provided by the administrator, the Host OS and/or the global zone. The Host OS and/or global zone records the aforementioned information in one or more data structures located within the global zone and/or Host OS. In one embodiment of the invention, creating the primary zone also includes specifying various configuration parameters as discussed above.

In Step 416, a primary zone is created in the global zone. More specifically, the primary zone is associated with an isPrimary attribute set to indicate that the non-global zone is a primary zone. In addition, the primary zone is associated with the label obtained in Step 402 and a unique IP address, which may be provided by the administrator, the Host OS and/or the global zone. The Host OS and/or global zone records the aforementioned information in one or more data structures located within the global zone and/or Host OS. In one embodiment of the invention, creating the primary zone also includes specifying various configuration parameters as discussed above.

Referring to FIG. 5, FIG. 5 shows a flowchart for processing packets received by a system in accordance with one or more embodiments of the invention. In Step 500, a packet is received by the host OS. In Step 502, the label and destination IP address are extracted from the packet. In Step 504, a determination is made about whether there is a zone that is associated with the <label, destination IP address> pair. If there is such a zone, the process proceeds to Step 506; otherwise the process proceeds to Step 508. In Step 506, the packet is transmitted to the destination zone (i.e., the zone identified in Step 504). In Step 508, the packet is dropped.

In view of FIG. 5, those skilled in the art will appreciate that the introduction of non-primary zones does not impact the security features related to packet processes that occur in global zones that only include primary zones. Further, the introduction of non-primary zones does not impact the routing of packets to the appropriate zone.

Figure 6:
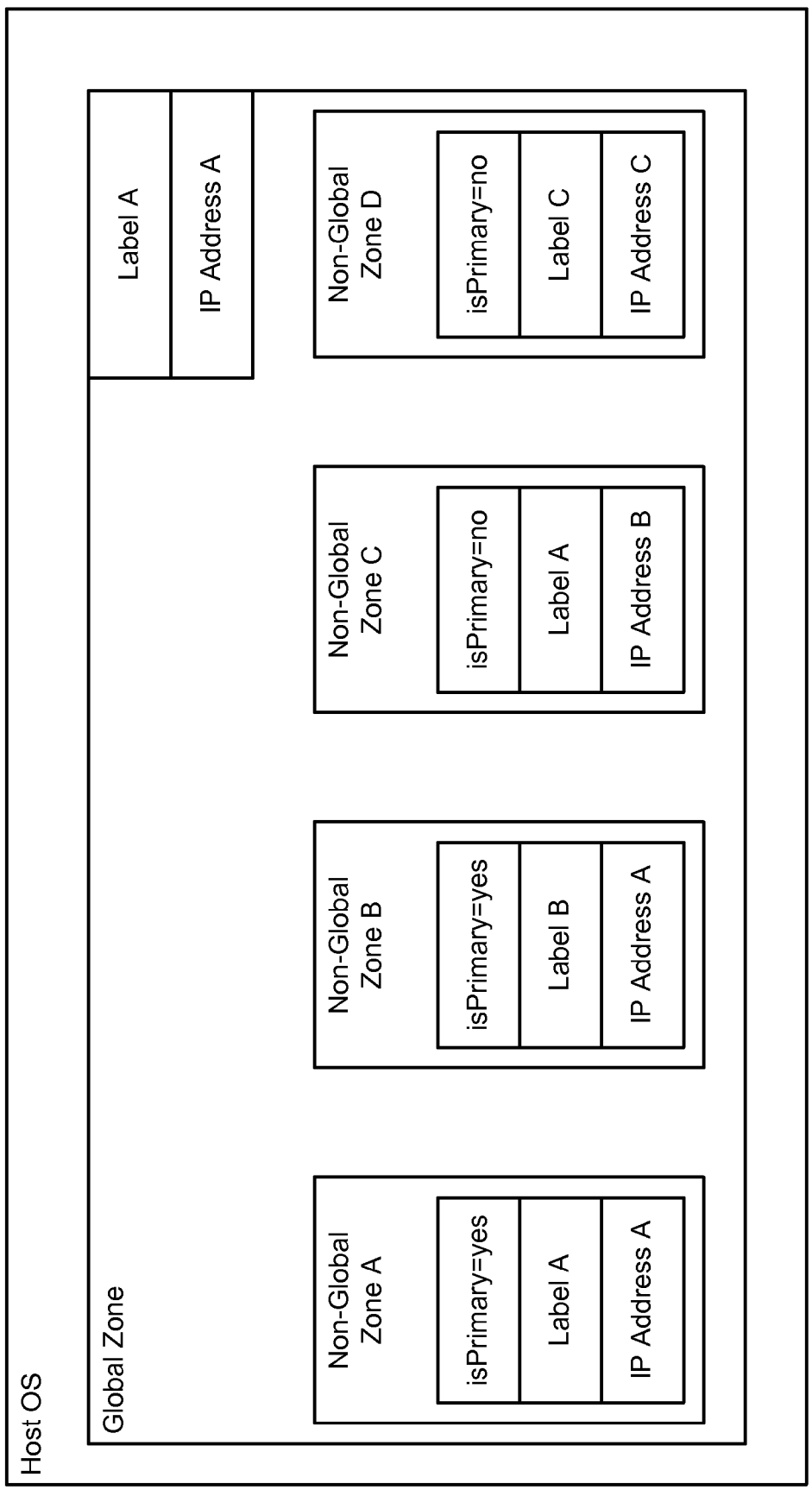
FIG. 6 shows an example of a system implementing primary zones and secondary zones in accordance with one or more embodiments of the invention.

FIG. 6 shows an example of a system implementing primary zones and secondary zones in accordance with one or more embodiments of the invention. The example is not intended to limit the scope of the invention.

Turning to FIG. 6, the host OS includes a global zone with <Label D, IP Address A>, two primary zones (non-global zone A, non-global zone B), and two non-primary zones (non-global zone C, non-global zone D). The primary zones have a set isPrimary attribute, the same IP address (i.e., IP address A), and different labels (i.e., Label A, Label B). In contrast, the non-primary zones have isPrimary attributes that are not set and the different IP addresses (i.e., IP address B, IP Address C). However, non-global zone C is associated with the same label as the primary zones (i.e., Label A) and non-global zone D is associated with a unique label (i.e., Label C).

One or more embodiments of the invention enable administrators to setup multiple non-global zones that have the same label while still preserving the legacy primary zone features and functionality. In this manner, the administrators have more granular control on how to implement zones, in particular, system administrators now have finer grain control on the assignment of configuration parameters and labels to particular non-global zones while maintaining backward compatibility with features implemented in primary zones.

Figure 7:
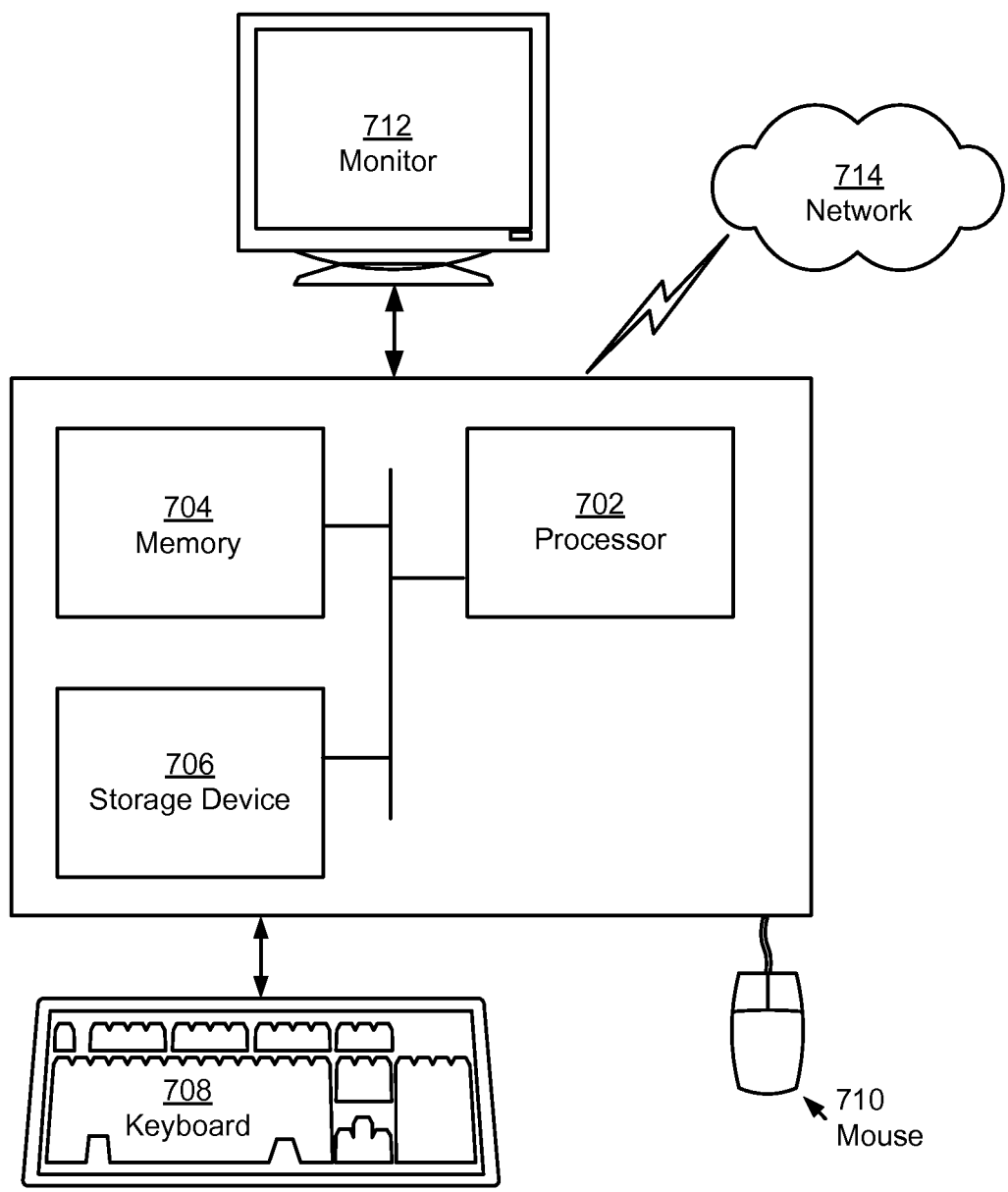
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer (700) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). The computer system (700) may be connected to a network (714) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., service front-end, service engine, profile database, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   a processor;
   a host operating system (OS) executing on the processor and comprising:
      a global zone;
      a first primary non-global (NG) zone associated with a first label and a first internet protocol (IP) address, wherein the first primary NG zone is accessible by a desktop layer of the system; and a second primary NG zone associated with a second label and the first IP address, wherein the second primary NG zone is accessible by the desktop layer of system;
wherein the global zone is configured to:
receive a first request to create a secondary NG zone with the first label; and
in response to the first request, create the secondary NG zone associated with the first label and a second IP address, wherein the secondary NG zone is not accessible by the desktop layer of the system.

2. The system of claim 1, wherein the first primary NG zone, the second primary NG zone, and the secondary NG zone are accessible by an administration layer of the system.

3. The system of claim 1, wherein the global zone is further configured to:
receive a second request to create a second secondary NG zone with the first label; and
in response to the second request, create the second secondary NG zone associated with the first label and a third IP address, wherein the second secondary NG zone is not accessible by the desktop layer of the system.

4. The system of claim 1, wherein the global zone is further configured to:
receive a second request to create a third primary NG zone with the second label; and
in response to the second request:
make a determination that the system already includes a primary NG zone with the second label;
in response to the determination, create the second secondary NG zone associated with the second label and a third IP address, wherein the second secondary NG zone is not accessible by the desktop layer of the system.

5. The system of claim 1, wherein the global zone is further configured to:
receive a second request to create a third primary NG zone with a third label; and
in response to the second request:
make a determination that the system does not include a primary NG zone with the third label;
in response to the determination, create the third primary NG zone associated with the third label and a third IP address, wherein the third primary NG zone is accessible by the desktop layer of the system.

6. The system of claim 1, wherein the global zone is further configured to:
receive a second request to create a third primary NG zone with a third label; and
in response to the second request:
make a determination that the system does not include a primary NG zone with the third label;
in response to the determination, create the third primary NG zone associated with the third label and the first IP address, wherein the third primary NG zone is accessible by the desktop layer of the system.

7. A system, comprising:
a processor;
a host operating system (OS) executing on the processor and comprising:
a global zone;
a first secondary non-global (NG) zone associated with a first label and a first internet protocol (IP) address, wherein the first secondary NG zone is not accessible by a desktop layer of the system; and
a second secondary NG zone associated with the first label and a second IP address, wherein the second secondary NG zone is not accessible by the desktop layer of system;
wherein the global zone is configured to:
receive a first request to create a first primary NG zone with the first label; and
in response to the first request, create the first primary NG zone associated with the first label and a third IP address, wherein the first primary NG zone is accessible by the desktop layer of the system.

8. The system of claim 7, wherein the global zone, the primary NG zone, the first secondary NG zone, and the second secondary NG zone all execute on a single operating system image.

9. The system of claim 7, wherein third IP address may be shared with at least one other primary NG zone on the system.

10. The system of claim 9, wherein the first IP address is not shared with any other primary NG zone on the system and wherein the first IP address is not shared by any other secondary NG zone on the system.

11. The system of claim 7, wherein the first label may be associated with at least one other secondary zone and wherein the first label may not be associated with a primary NG zone other than the first primary NG zone.

12. The system of claim 7, wherein the global zone is further configured to:
receive a second request to create a second primary NG zone with the first label; and
in response to the second request:
make a determination that the system already includes a primary NG zone with the first label;
in response to the determination, deny the request to create a second primary NG zone.

13. The system of claim 7, wherein the global zone is further configured to:
receive a first request from a first process in the first secondary NG zone to change a label of a file in the first secondary NG zone;
determine that the first request originated in a non-primary NG zone; and
in response to the determination, deny the first request.

14. The system of claim 13, wherein the global zone is further configured to:
receive a second request from a second process in the first primary NG zone to change a current label of a file in the first primary NG zone to an updated label;
determine that the first request originated in a primary NG zone; and
in response to the determination, identify a target primary zone in the system that is associated with a label that matches the updated label;
create a copy of the file in the target primary zone and associate the copy of the file with the updated label;
remove the file from the first primary NG zone.

15. The system of claim 7, wherein the first secondary NG zone is associated with a first isPrimary attribute that is not set.

16. The system of claim 15, wherein the first primary NG zone is associated with a second isPrimary attribute that is set.

17. The system of claim 16, wherein access to the desktop layer by the first primary NG zone is based on the isPrimary attribute.

18. The system of claim 7, wherein the first primary NG zone is associated with a first set of configuration parameters and the first secondary NG zone is associated with a second set of configuration parameters.

19. The system of claim 18, wherein the first set of configuration parameters comprises a privilege.

20. The system of claim 18, wherein the second set of configuration parameters specifies that the first secondary zone is immutable.

* * * * *

UNITED STATES PATENT AND TRADEMARK OFFICE
CERTIFICATE OF CORRECTION

| | |
|---|---|
| PATENT NO. | : 8,819,681 B2 |
| APPLICATION NO. | : 13/570900 |
| DATED | : August 26, 2014 |
| INVENTOR(S) | : Faden |

It is certified that error appears in the above-identified patent and that said Letters Patent is hereby corrected as shown below:

In the Specification

In column 6, line 66, delete "noe" and insert -- zone --, therefor.

Signed and Sealed this
Tenth Day of March, 2015

Michelle K. Lee
*Deputy Director of the United States Patent and Trademark Office*